United States Patent
Pattantyus

[19]

[11] Patent Number: 5,926,016
[45] Date of Patent: Jul. 20, 1999

[54] CUSTOM INTEGRATED WHEEL-SPEED SENSOR CIRCUIT WITH SENSITIVITY ADJUSTMENT

[75] Inventor: Tamas Imre Pattantyus, North Olmstead, Ohio

[73] Assignee: AlliedSignal Truck Brake Systems Company, Elyria, Ohio

[21] Appl. No.: 08/594,823

[22] Filed: Jan. 31, 1996

[51] Int. Cl.[6] .............. G01P 3/481; G01P 3/48; G01P 3/54; G01R 33/025
[52] U.S. Cl. ............ 324/166; 324/173; 324/207.12
[58] Field of Search .............. 324/160, 161, 324/166, 173, 207.12, 207.25; 188/181 R, 181 C; 303/166, 168, 199; 364/565

[56] References Cited

U.S. PATENT DOCUMENTS

| | | | |
|---|---|---|---|
| 4,847,556 | 7/1989 | Langley | 324/207.18 |
| 5,103,171 | 4/1992 | Petersen | 324/161 |
| 5,359,238 | 10/1994 | Lesko | 324/207.12 |

*Primary Examiner*—Walter E. Snow
*Attorney, Agent, or Firm*—Howard G. Massung

[57] ABSTRACT

A multi-channel wheel speed sensor having a custom integrated interface circuit. The interface circuit is configured with voltage programmable threshold adjustment allowing the circuit sensitivity to be specially tuned to detect wheel speeds in very specific ranges for a variety of applications. This feature can be implemented in ABS and/or traction control systems wherein in ABS mode a lower sensitivity adjustment can be used since wheel speeds below 5 mph do not need to sensed and processed precisely and in traction control mode very low wheel speeds, 1–1.5 mph are sensed and processed especially at non-drive wheels which provide speed reference for slipping or spinning drive wheels. The interface circuit is also configured with a test circuit for testing the integrity of the speed sensors and for providing information to the controller about the sensor/tone wheel gap.

17 Claims, 9 Drawing Sheets

CUSTOM INTEGRATED WHEEL-SPEED SENSOR CIRCUIT WITH SENSITIVITY ADJUSTMENT

FIELD OF THE INVENTION

This invention relates to vehicle wheel speed sensors. More particularly, this invention relates to multi-channel wheel-speed sensor interface custom integrated circuits.

BACKGROUND OF THE INVENTION

Antilock braking systems (ABS) and traction control systems have become increasingly popular in both passenger cars and heavy duty vehicles. These systems require accurate wheel speed signals which vary in accordance with vehicle wheel speed. Such wheel speed signals are commonly generated by wheel speed sensors. These wheel speed sensors generally include a serrated tone wheel, which is mounted for rotation with the vehicle wheel, a sensing head, which is mounted to a non-rotating part of the vehicle adjacent to the tone wheel, and an interface circuit, which receives and conditions signals generated by the sensing head. The sensing head can consist of a coil wound around a cylindrical permanent magnet, the end face of which is in close proximity with the tone wheel. The tone wheel is usually made of a ferromagnetic material and is provided with serrations circumferentially spaced equally around the tone wheel. As the tone wheel turns in front of the sensing head, the flux density inside of the coil will change depending on whether the end face of the permanent magnet is facing a tooth or a serration defined by two adjacent teeth. This flux change induces an alternating voltage in the coil, the frequency of which is equal to the rate of change of the teeth and serrations of the tone wheel rotating past the end face of the magnet. Accordingly, the frequency of the output of the sensor is proportional to the vehicle wheel speed.

Since wheel speed sensors are critical components of ABS and traction control systems, there is a need for an wheel speed sensor interface circuit which tests the integrity of the speed sensors thus detecting faulty wheel speed signals. There is also a need for an interface circuit which includes built in safeguards for preventing faulty wheel speed signals. There is a further need for a wheel speed sensor which can be selectively tuned to accurately and efficiently detect wheel speeds in specific speed ranges for a variety of applications. There is a still further need for a multichannel, multiplexed interface circuit capable of conditioning and testing wheel speed signals generated by the multiple sensing heads included on a single vehicle.

SUMMARY OF THE INVENTION

The present invention provides a multi-channel wheel speed sensor interface circuit implemented as a custom integrated circuit. The circuit is configured to have adjustable sensitivity, which can be adjusted to accurately and efficiently sense high wheel speeds in an ABS mode or lower wheel speeds in a traction control mode.

One object of the present invention is to provide a wheel speed sensor interface circuit which tests the integrity of the speed sensors thus detecting faulty wheel speed signals.

Another object of the present invention is to provide a wheel speed sensor interface circuit which includes built in safeguards for preventing faulty wheel speed signals.

It is a further object of the present invention to provide a wheel speed sensor which can be selectively tuned to accurately and efficiently detect wheel speeds in specific speed ranges for a variety of applications.

It is still another object of the present invention to provide a multichannel, multiplexed interface circuit capable of conditioning and testing wheel speed signals generated by the multiple sensing heads included on a single vehicle.

In order to achieve the foregoing objects, the present invention provides, a custom integrated circuit or Application Specific Integrated Circuit (ASIC) having multiple comparators with voltage programmable threshold adjustment, multiple multiplexed sensor test circuits and a multichannel analog multiplexer which provides an output signal proportional to one of the multiplexer input signals.

The voltage programmable threshold adjustment allows the interface circuit to be specially tuned to detect wheel speeds in very specific ranges. This feature can be implemented so that in ABS mode a lower sensitivity adjustment can be used since wheel speeds below 5 mph do not need to be sensed and processed precisely. On the other hand, in traction control mode, it is essential that wheel speed signals equivalent to 1–1.5 mph be sensed and processed, especially at the non-drive wheels which provide speed reference for slipping or spinning drive wheels.

The multiple multiplexed sensor test circuits and multichannel analog multiplexer provide means for testing the integrity of the speed senors. The multiplexed analog output signal amplitude is checked at given wheel speeds to estimate the gap between the sensor and tone wheel. Even though the analog signal used in the analog multiplexing process is a filtered and attenuated version of the wheel speed sensor output, it contains enough information to pass judgment on the gap between the sensor device and the tone wheel at given (low) wheel speeds. The function of the multiplexed analog output is to provide some dimensional information to the controller about the sensor gap.

In this application, the multiple multiplexed sensor test circuits and multi-channel analog multiplexer allow for implementing the test function to include selecting, decoding and enabling the test function in combination with the selection of the multiplexed analog channel. This particular implementation enables a system designer to analyze both the digital output of the comparator and the analog behavior of the input line during testing.

The present invention also provides built in safeguards for preventing faulty wheel speed signals. For example, in the preferred embodiment balanced biasing at the multiplexing input is accomplished by using a multiplexed dummy input transistor for the sensor node which does not drive the multiplexed analog input. This balanced biasing insures that the sensitivity and symmetry of the interface circuit is not upset.

Further objects, features and advantages of the invention will become apparent from a consideration of the following description and the appended claims when taken in connection with the accompanying drawings.

DETAILED DESCRIPTION OF THE PREFERRED EMBODIMENT

Preferred embodiments of the variable reluctance wheel speed sensor interface custom integrated circuit are described herebelow with reference to the drawings.

Figure 1A:
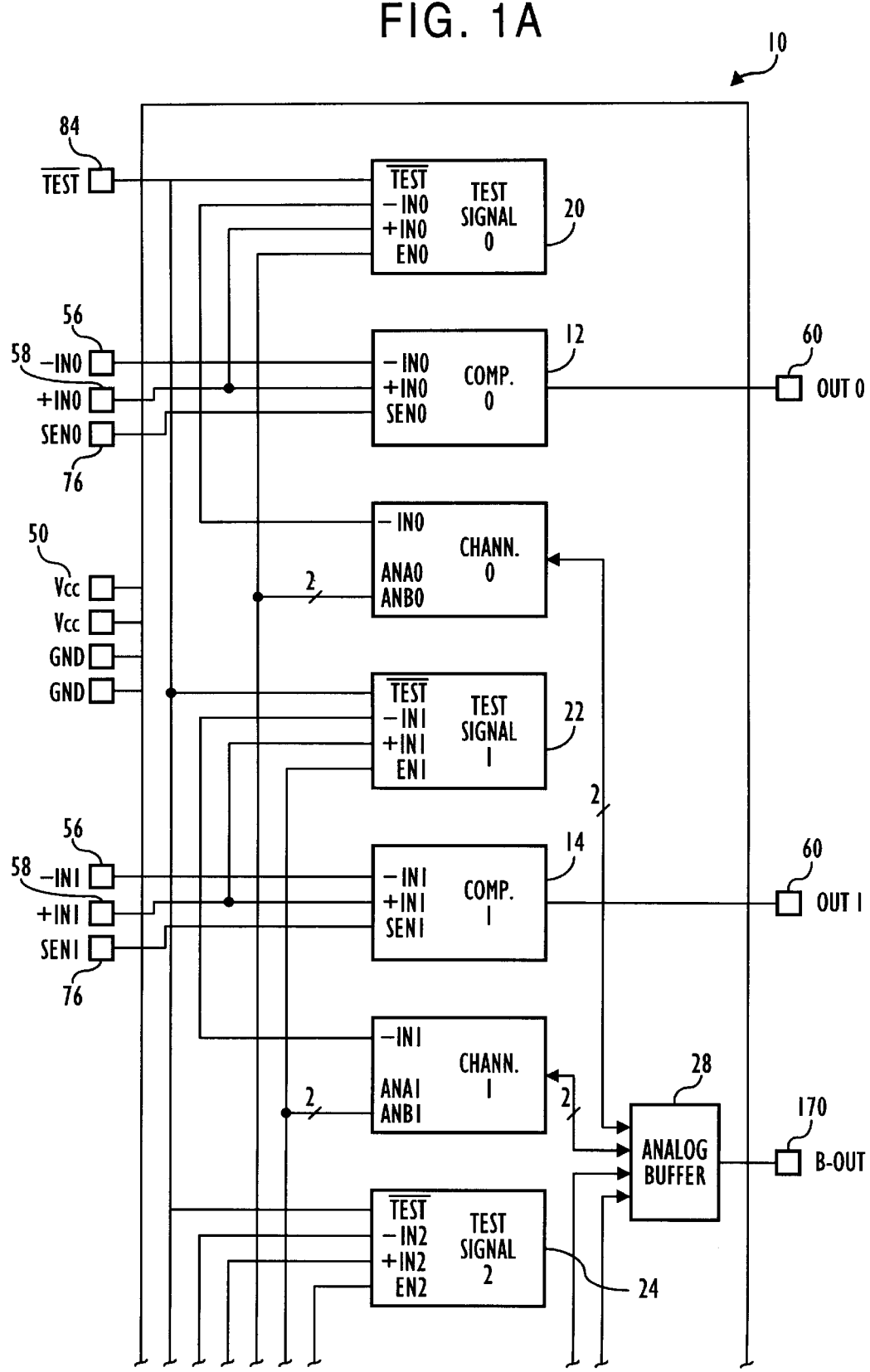
FIG. 1 is a partial schematic block diagram of the variable reluctance wheel speed sensor interface application specific integrated circuit of the present invention.
Figure 1B:
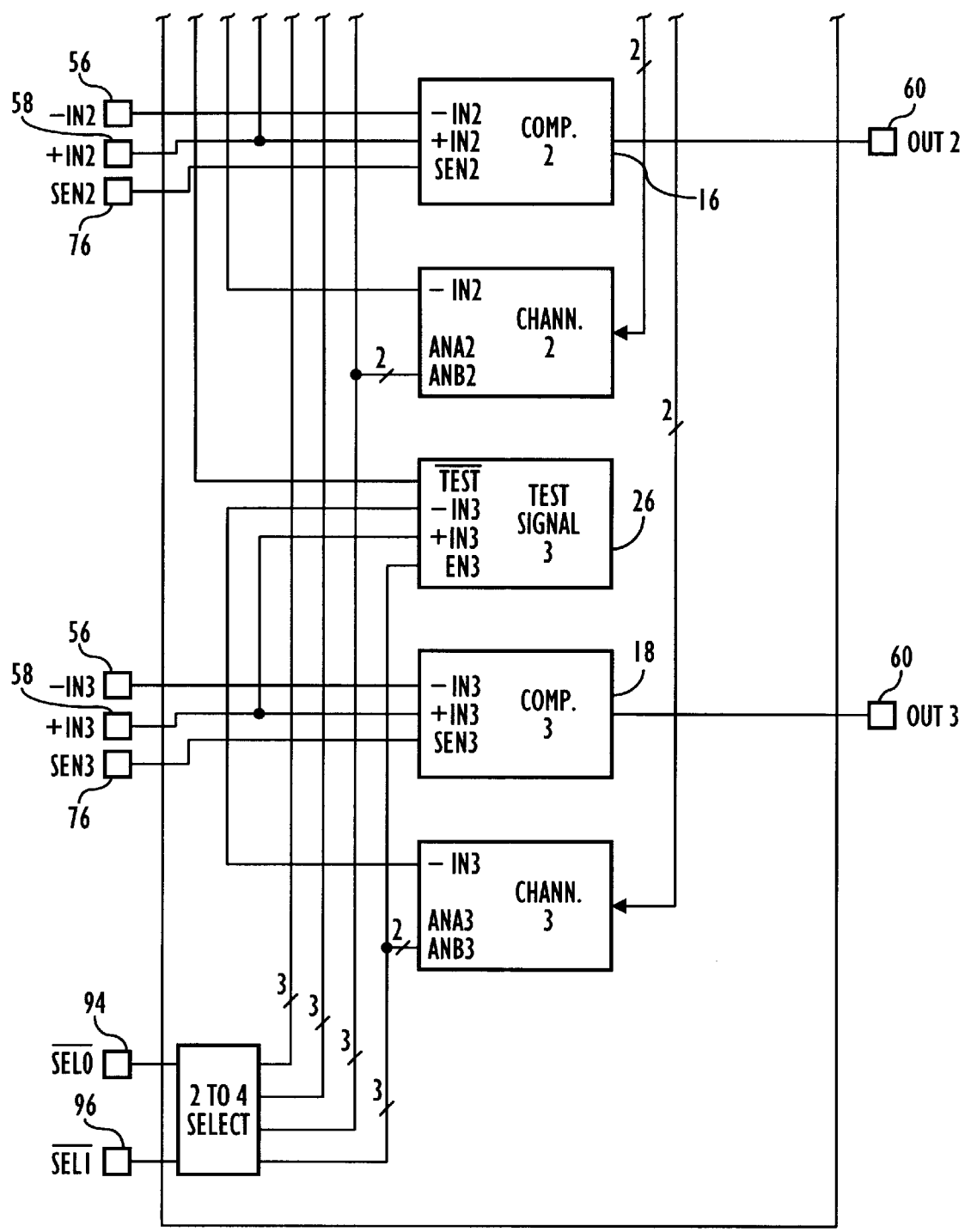

Referring to FIG. 1, in the preferred embodiment, a four channel wheel speed sensor interface circuit is implemented as a custom integrated circuit. The custom integrated circuit or application specific integrated circuit (ASIC), indicated generally at 10, includes four comparators 12, 14, 16, 18, with voltage programmable threshold adjustment, four multiplexed sensor test circuits 20, 22, 24, 26 and a four channel analog multiplexer 28 which provides an output signal proportional to one of four input signals.

Figure 2:
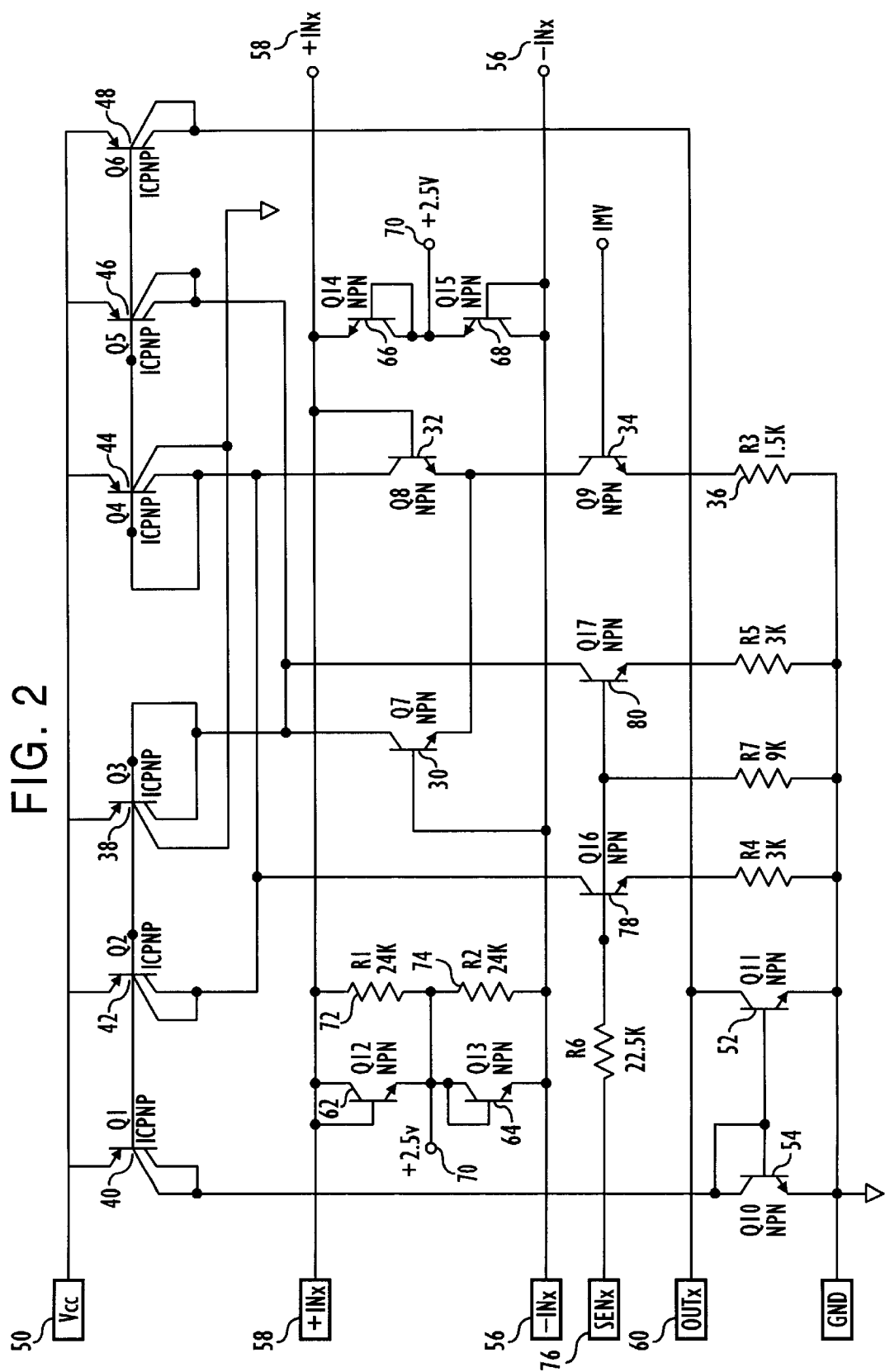
FIG. 2 is a schematic circuit diagram of the comparator circuit and limiter with voltage programmable sensitivity control of the present invention.

The detailed comparator circuit, as it is implemented with linear array components in the preferred embodiment, is shown in FIG. 2. It should be noted that FIG. 2 illustrates only one of the four channels of the preferred embodiment of the present invention. The comparator circuit includes differential transistors 30 and 32 having their common emitter tied to a very high impedance current source represented by transistor 34 and resistor 36. The current into the common emitter of transistors 30 and 32 is approximately 180 uA. The collector of transistor 30 drives a current mirror transistor 38 setting the collector current for transistors 40 and 42. There is an identical circuit arrangement with transistors 32, 44, 46 and 48. However the collector load of transistor 30 is the current through transistor 46 which mirrors the current of transistor 32 and, similarly, the load of transistor 32 is transistor 42 mirroring the current of transistor 30. Therefore, if transistor 30 is conducting all the current set by transistor 34, transistor 38 is positively biased and the current of transistor 30 is mirrored to transistor 42, which will pinch the collector voltage of transistor 32 to near Vcc voltage 50. Because transistor 32 is not conducting in this case, transistors 44, 46 and 48 are all off and the collector voltage of transistor 30 is the voltage drop across the current mirror, transistor 38, (a few tens of millivolts less than the base voltage drop of transistor 38). Since the current mirror transistor 38 is active, transistor 40 is also conducting and its current is mirrored over to transistor 52 via transistor 54. The conditions described above are caused by the base voltage of transistor 30 being more positive than that of transistor 32, or input −INx 56 is more positive than input +INx 58. Since transistor 48 is turned off, its collector represents a very large impedance, therefore transistor 52 will cause output line OUTx 60 to be near ground potential Similar steady state conditions exist when transistor 32 is conducting all the current of transistor 34. In this case, transistor 40 will not conduct therefore transistors 52 and 54 will not conduct either. However, transistor 48 will conduct causing the output line OUTx 60 to be near Vcc 50 potential. In summary, when the voltage at −INx 56 is more positive than the voltage at +INx 58, output line OUTx 60 is low (near ground potential) and when the potential at +INx 58 is more positive than at −INx 56, output line OUTx 60 is high (near Vcc 50).

Notice that the input nodes are protected by back-to-back diode pairs 62, 64 and 66, 68 against excessively large input signals. The protection is effective for both large differential and common mode signals because all diodes are referenced to an internally generated +2.5 V DC level 70. The DC operating point of the inputs are ascertained by resistors 72 and 74 (24 kohm each) which are also returned to +2.5 V70.

Hysterisis (sensitivity) in the context of the comparators 12, 14, 16, and 18 is defined as a voltage level difference at the input which causes a state change at the output. If the differential input voltage variation is confined between certain voltage limits no change in the output state will occur.

The comparator circuit described above introduces hysterisis by cross coupling the control of collector loads and mirroring the currents through dynamic collector loads. If, for instance, transistor 30 is conducting while the input is changing over from −INx 56 being more positive than +INx 58 to the opposite state, the mirrored current from transistors 38 and 42 prevents the development of active collector loads on the side of transistor 32 until it is conducting sufficiently large currents to overcome the effects of transistors 30, 38 and 42. In other words, the prevailing current density conditions in the dynamic and cross-coupled collector loads are reflected to the bases of transistors 30 and 32, i.e. to the comparator inputs. The approximate law is that hysterisis at the inputs is 20 mV times the number of transistors of the type of 42 and 46 which are controlled respectively by current mirrors 38 and 44. Thus, the comparator shown in FIG. 2 will have approximately 40 mV hysterisis (the measured value was 48 mV). When a positive voltage level in excess of 1.75 V is connected to input SENx 76, transistors 78 and 80 begin to conduct (numerical values are valid at 25° C.) and the current density distribution between the two halves of the cross coupled dynamic load transistors 38–48 will be modified. The effect is as if more and more transistors were connected in parallel in the array of dynamic load transistors as the voltage at input SENx 76 is increased and with it the current through transistors 78 and 80. If SENx 76 is +5.0 V, the current through transistors 78 and 80 is approximately 262 uA and the hysterisis band of the comparator is increased by a factor of 2.5 or to approximately 120 mV. As the voltage is varied from 1.73 V to 5.0 V, the hysterisis band of the comparator will change along a near straight line from 48 mV to 120 mV.

The adjustable hysterisis (or sensitivity) is used to adjust the sensitivity of the wheel speed sensor. For example, when in ABS mode, a lower sensitivity (larger hysterisis band) adjustment can be used because wheel-speeds below 5 mph do not need to be sensed and processed precisely. On the other hand, in traction control mode, wheel-speed signals equivalent to 1–1.5 mph are important and need to be sensed and processed especially at the non-drive wheels which provide speed reference for slipping or spinning drive wheels, therefore a narrow hysterisis band is preferred.

Figure 3:
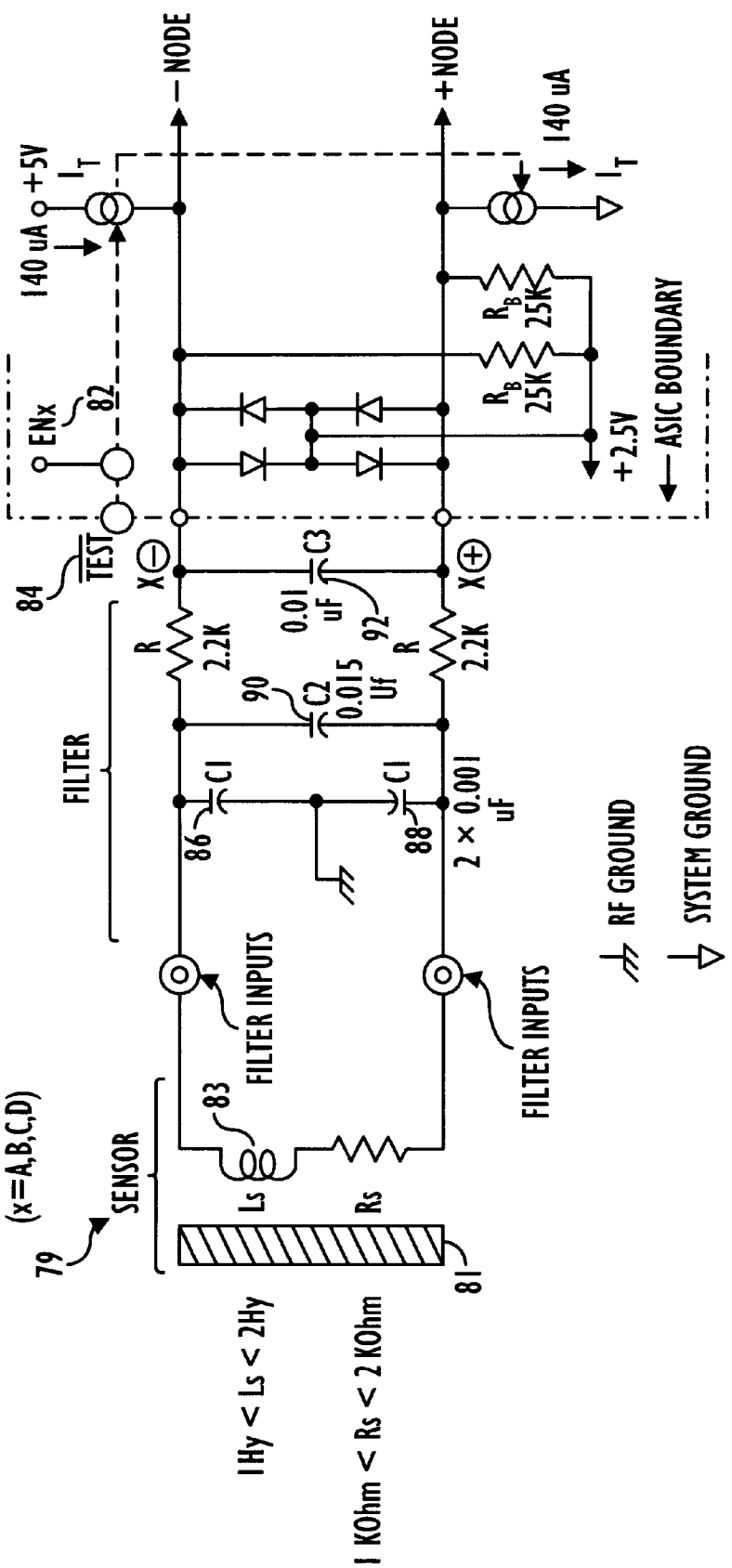
FIG. 3 is a schematic circuit diagram of the test signal generation circuit including the front-end filter and wheel speed sensor transducer of the present invention.
Figure 4:
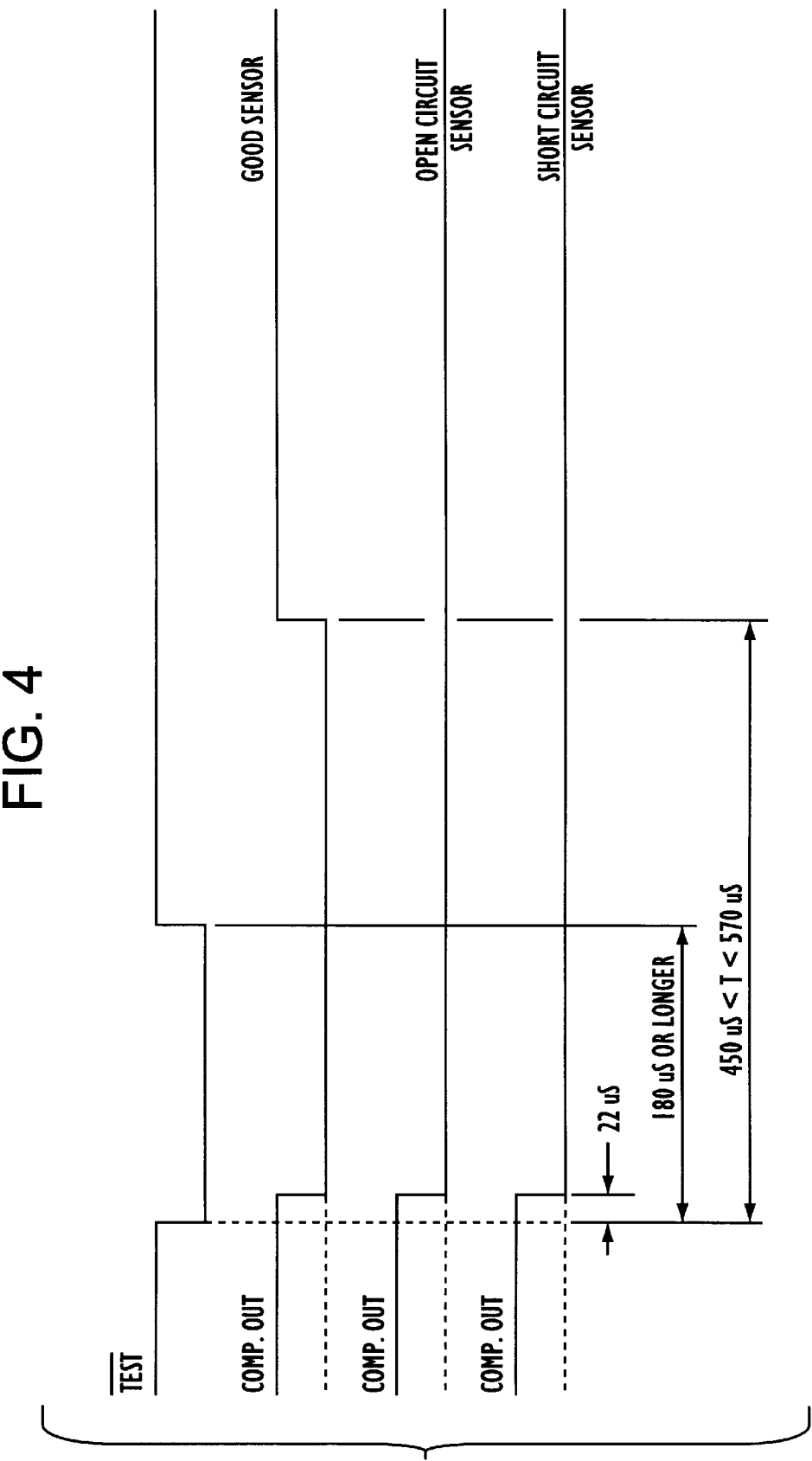
FIG. 4 is a test pulse timing diagram of the test circuit of FIG. 3.

The fundamental principle of test signal generation is illustrated in FIGS. 3 and 4. The speed sensor 79, includes a tone wheel 81 and sensing head 83 which generate an analog wheel speed signal proportional to the rotational speed of a vehicle wheel. An enabling signal ENx 82 and a logic level to 0 V, shown as TEST 84, open two current sources: one sources 140 uA current into −INx 56 and the other sinks 140 uA from +INx 58. The TEST 84 input is only a negative impulse lasting for 180 $\mu$s or longer.

If the wheel-speed input is zero when the TEST pulse 84 is applied, all capacitors 86, 88, 90, 92 in FIG. 3 are discharged and the differential input is also 0 V initially.

With the test currents flowing as indicated above, a differential voltage develops both at the input of the comparator and across the wheel-speed sensor impedance. After a short while, capacitor 92 charges up sufficiently to change the state of the comparator (shown as a nominal 22 $\mu$s delay in FIG. 4). While the pulse TEST 84 is low, all capacitors are charging and a small current also builds up in the sensor impedance.

When the TEST 84 pulse becomes high again (+5.0 V) the test currents are turned off and the built up charge in the capacitors and current through the sensor inductance will decay to zero. However, the decay is accompanied by an oscillating process, for the inductive component of the sensor impedance and capacitors 86, 88 and 90 form a tank circuit whose approximate resonant frequency is given by $1/(2*\pi*\sqrt{Ls*(C90+C86/2)})$. While the stored energy is being dissipated to zero, the oscillatory signal at capacitors 86 and 88 will be a decaying alternating voltage at the filter input and the comparator will pick up at least the first polarity change. Thus, some time after (450 $\mu$s to 570 $\mu$s) the negative leading edge of the 180 82 s wide TEST pulse 84, a good sensor, filter and comparator combination will manifest itself as a negative to positive transition at OUTX 60. In FIG. 3, typical circuit values for the preferred embodiment are shown, other values are also possible, of course. The numerical values can be measured with sensor inductance between 1H and 2H, C=\86+C88=0.001 $\mu$F and C90=0.015 $\mu$F.

Figure 5:
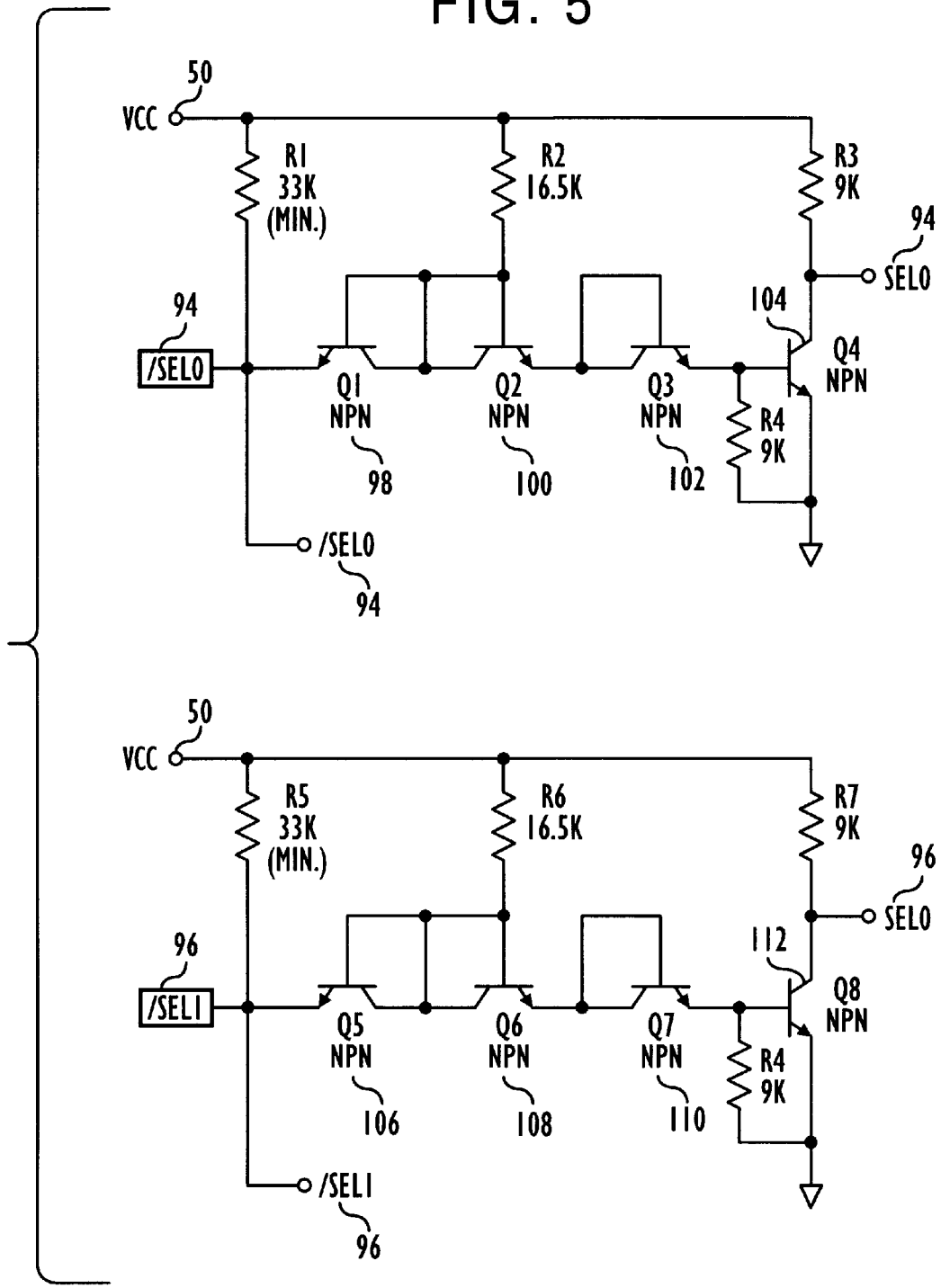
FIG. 5 is a schematic circuit diagram of the channel selector circuit of the present invention.
Figure 6:
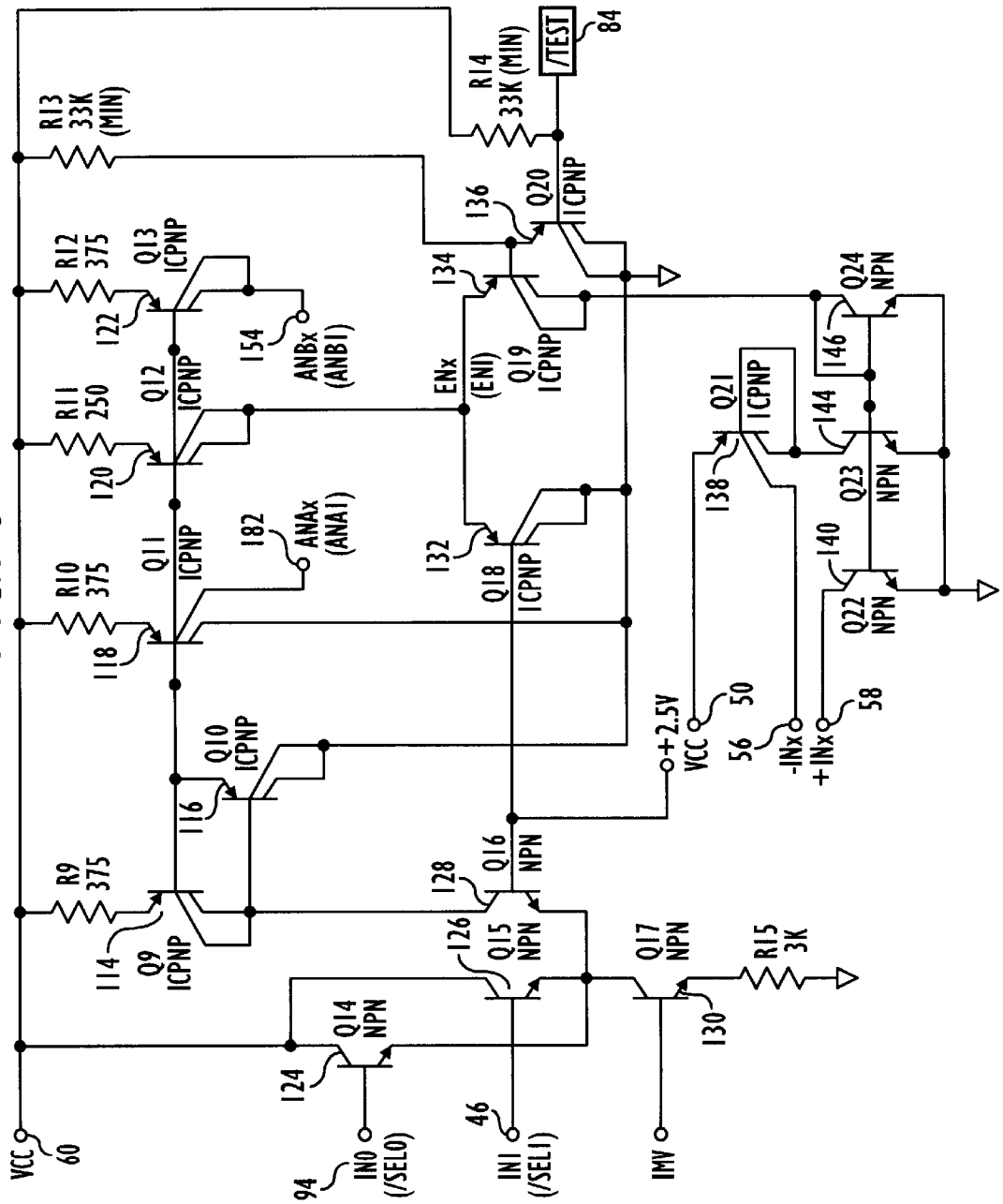
FIG. 6 is a schematic circuit diagram of the test current generator of the present invention.
Figure 7:
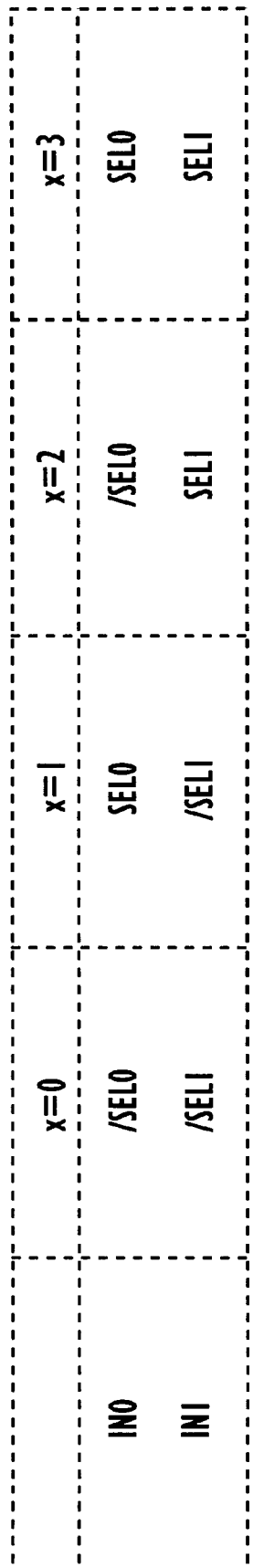
FIG. 7 is a state table of the channel selector and test current generator of FIGS. 5 and 6.

The ENx signal 82 is derived from two logic level inputs, SEL0 94 and SEL1 96. The decoding of the two SEL signals 94 and 96 and the selective test signal generation is shown in FIGS. 5–7. Inputs SEL0 94 and SEL1 96 are respectively inverted by pulse amplifiers comprising of transistors 98, 100, 102, 104 and 106, 108, 110, 112. The inputs and the outputs together will define four unique pairings as shown in the TABLE in FIG. 7. There are four distinct decoding circuits on the ASIC, each in the form of a circuit consisting of transistors 114, 116, 118 . . . 146. In the segment identified by x=0, signals SEL0 94 and SEL1 96 are respectively connected to the bases of transistors 124 and 126. Transistors 124 and 126 in FIG. 6 form a negative input AND-gate: when both inputs IN0 (SEL0) 94 and IN1 (SEL1) 96 are logic low (less positive than +2.5 V) all the current sourced through transistor 130 will flow through transistor 128, activating the multiple current mirrors consisting of transistors 114, 116, . . . 122. Transistor 120 is the current source to the pulse amplifier controlling the test current sources. When current is gated through transistor 120, the common emitter transistors 132 and 134 are activated and if the TEST 84 input is at logic low (i.e. less positive than +1.0 V) all the current through transistor 120 will flow through transistor 134. The current of transistor 134 is further mirrored into a source and a sink (with respect to ground) by transistors 138,140,144 and 146.

The current mirror system consisting of transistors 114, 116, . . . 122 and activated by the negative input AND-gate of transistors 124, 126, 128, 130, also provides selected current sources (ANAx and ANBX) to the multiplexed analog stages (described in more detail later).

The multiplexed analog sections consist of two major circuit segments:

i) the multiplexed differential stages; and ii) the common output stage.

Figure 8:
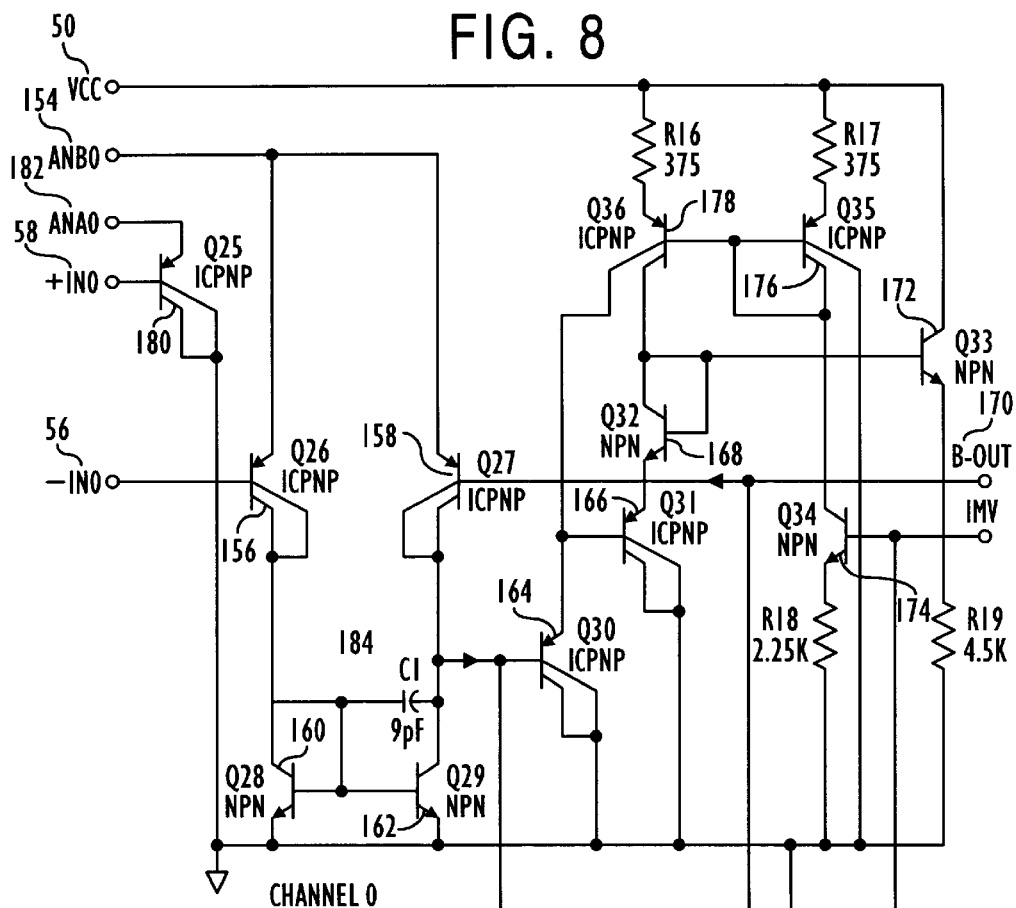
FIG. 8 is a schematic circuit diagram of the multiplexed analog output circuit of the present invention.
Figure 8:
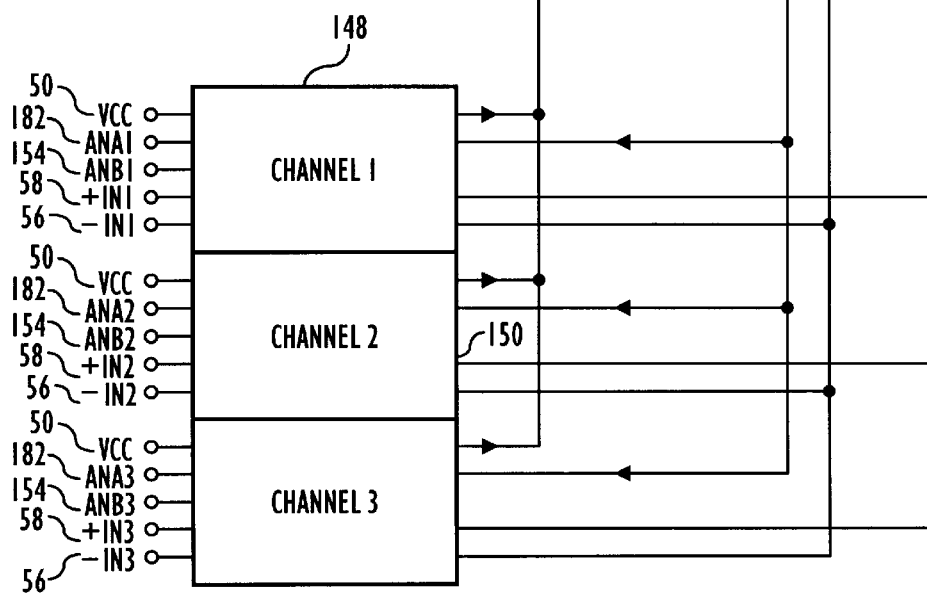

The multiplexed differential stages are shown in FIG. 8. A detailed circuit schematic is drawn for channel 0 (x=0) and the other channels are represented by functional blocks 148,150,152. The common emitters of differential transistors are current driven by ANB0 154, the structure of which is shown in full detail in FIG. 6. ANB0 154 is supplied by transistor 122 for x=0. When ANB0 154 is active all other ANBx and ANAx current sources are turned off, only the x=0 differential stage is conducting any current. If the bases of transistors 156 and 158 are at equal potential, the current through each of those transistors are equal. The input to transistor 156 is taken from –IN0 56 which is half the output of the filtered wheelspeed sensor output (this follows from the differential connection of the wheelspeed sensor to the signal conditioning electronics and from the symmetric biasing of the comparator input transistors 30 and 32 in FIG. 2). The current of transistor 156 will activate the current mirror of transistors 160 and 162. The collector of transistor 162 represents a huge impedance at low frequencies, therefore small currents through transistor 162 may cause large voltage drops. The voltage dropping on the collector of transistor 162 is coupled to the output through two emitter followers 164, 166 and a level shifting diode 168 before it is connected to the output emitter follower. The output of the emitter follower, B-OUT 170, is the multiplexed and buffered analog output which is proportional to the wheel-speed sensor output. The natural state of transistors 158 and 162 is that 158 conducts the same current as transistor 156 and the voltage drop across transistor 162 is such that B-OUT 170 matches –IN0 56. Thus, the multiplexed and active analog state (transistors 156, 158, 160, 162) forms a voltage follower buffer with the common output stage (transistors 164, 166, 168, 172, 174, 176, 178).

There are some additional circuits in the analog multiplexing part of this custom IC. The purpose of transistor 180 is to load the input node +IN0 58 exactly the same way as –IN0 56 node is loaded. This is accomplished by biasing the emitter of transistor 180 with half the current of ANB0 154 (i.e. ANA0 182). Referring to FIG. 6, ANA0 182 is derived from only one collector of transistor 118, while the other collector is grounded. One collector of transistor 118 conducts half the mirrored current determined by transistors 114, 116, 128, and 130. Since the differential transistors 156 and 158 in FIG. 8 evenly divide the common emitter current when they are in balance, the current through transistor 156 is half that of ANB0 154 but so is ANA0 182. By equalizing the emitter currents between transistors 180 and 156, their base currents will also be matched. Therefore the offset voltages when the analog stage is activated are also balanced. This is an important feature, for different offset voltages would not only change the hysteresis (sensitivity) of the comparator but would also upset its symmetry.

The other auxiliary circuit is the current mirror consisting of transistors 174, 176 and 178. Emitter followers approach the theoretical maximum unity voltage transfer between their base input voltage and emitter output voltage if the dynamic load in the emitter is infinitely large. Transistor 178 mirrors the current of transistors 174 and 176 through its collectors into the emitters of transistors 164 and 166. Note that the dynamic impedances of those collectors are very large and approach the ideal case.

There is a 9 pF capacitor, 184, connected across the collectors of transistors 156 and 158. It limits the bandwidth of the active analog channel and improves the stability and prevents unwanted oscillations or oscillatory behavior.

The three inactive stages represent very large impedances on the common lines driving the common buffer at the base of transistor 164 or feeding the B-OUT signal 170 back to the bases of transistor 158 or its equivalent. Therefore, the effect of the inactive stages is negligible.

It is to be understood that the invention is not limited to the exact construction illustrated and described above, but that various changes and modifications may be made without departing from the spirit and scope of the invention as defined in the following claims.

We claim:

1. A speed sensor apparatus for measuring the rotational speed of a rotating member, said apparatus comprising:
    a speed sensor for sensing said rotational speed and generating a speed signal indicative of said rotational speed;
    a comparator circuit for comparing said speed signal with a reference signal and generating an output signal for transmission to a processor, wherein said comparator circuit includes no more than one comparator;
    an adjusting circuit for adjusting the sensitivity of said comparator circuit such that said comparator circuit may be specially tuned to detect specific ranges of rotational speeds, whereby the detection of small amplitude or large amplitude signals is optimized; and
    a monitoring circuit for monitoring said speed signal amplitude at a known rotational speed to approximately determine a gap between said speed sensor and said rotating member.

2. An apparatus according to claim 1 wherein said comparator circuit includes a voltage programmable threshold adjustment circuit.

3. An apparatus according to claim 2 wherein said comparator circuit comprises a first and second transistor each having an emitter, base and collector, said first and second transistor emitters being tied together to a high impedance current source, said first and second transistor collectors being cross-coupled, wherein said first transistor collector is connected to a first current mirror circuit and said second transistor collector being connected to a second current mirror circuit such that a first transistor collector load is reflected in said first transistor base and a second transistor collector load is reflected in said second transistor base such that said first and second current mirror determine said comparator circuit sensitivity.

4. A multichannel speed sensor apparatus for measuring the rotational speed of a plurality of rotating members, said apparatus comprising:
    a plurality of speed sensors for sensing said rotational speed and generating a speed signal indicative of said rotational speed of each of said plurality of rotating members;
    a plurality of comparators for comparing said speed signals with reference signals and generating output signals for transmission to a processing means, wherein a single said comparator is connected to each said speed signal;
    an adjusting circuit associated with each said comparator for adjusting the sensitivity of each said comparator such that each said comparator may be specially tuned to detect specific ranges of rotational speeds of an associated one of said plurality of rotating members, whereby the detection of small amplitude or large amplitude signals is optimized; and
    a circuit for determining a gap between at least one of said plurality of rotating members and an associated one of said plurality of speed sensors at a given speed of an associated one of said rotating members.

5. An apparatus according to claim 4, wherein said circuit comprises a multichannel multiplexer for multiplexing said speed signals and corresponding output signals, and wherein each said speed signal amplitude may be checked at a known rotational speed to determine said gap.

6. An apparatus according to claim 4 wherein each said comparator comprises a comparator circuit with a voltage programmable threshold adjustment.

7. An apparatus according to claim 6 wherein each said comparator circuit comprises a first and second transistor each having an emitter, base and collector, said first and second transistor emitters being tied together to a high impedance current source, said first and second transistor collectors being cross-coupled, wherein said first transistor collector is connected to a first current mirror circuit and said second transistor collector being connected to a second current mirror circuit such that a first transistor collector load is reflected in said first transistor base and a second transistor collector load is reflected in said second transistor base such that said first and second surrent mirror determine said comparator circuit sensitivity.

8. An apparatus according to claim 5 further comprising a test circuit for selecting one of said plurality of speed sensors for testing based upon a speed sensor selected by said multiplexer and generating a test signal for testing said selected speed sensor.

9. An apparatus according to claim 5 further comprising a multiplexed dummy input transistor which does not drive a multichannel multiplexer input for providing a balanced biasing for said multiplexer.

10. A wheel speed sensor apparatus for sensing the rotational speed of a rotating vehicle wheel, said apparatus comprising:
    a ferromagnetic tone wheel mounted for rotation on said rotating wheel;
    a sensing head mounted to a non-rotating part of the vehicle adjacent to said tone wheel for sensing rotation of said tone wheel and generating a signal proportional to said rotating wheel rotational speed; and
    an interface circuit comprising;
        a comparator for comparing said alternating voltage with a reference signal and generating an output signal for transmission to a processor;
        a circuit for adjusting the sensitivity of said comparator such that said comparator may be specially tuned to detect specific ranges of rotational speeds, whereby the detection of small amplitude or large amplitude signals is optimized; and
        a circuit for providing information from which a gap between said tone wheel and said sensing head can be determined at a known rotational speed.

11. An apparatus according to claim 10 wherein said comparator comprises a comparator circuit with a voltage programmable threshold adjustment.

12. An apparatus according to claim 11 wherein said comparator circuit comprises a first and second transistor each having an emitter, base and collector, said first and second transistor emitters being tied together to a high impedance current source, said first and second transistor collectors being cross-coupled, wherein said first transistor collector is connected to a first current mirror circuit and said second transistor collector being connected to a second current mirror circuit such that a first transistor collector load is reflected in said first transistor base and a second transistor collector load is reflected in said second transistor base such that said first and second current mirrors determine said comparator circuit sensitivity.

13. An apparatus according to claim 10, further comprising a test circuit for testing the integrity of said speed sensor, wherein said test circuit generates a test signal for testing said speed sensor.

14. An apparatus according to claim 10 further comprising a plurality of tone wheels, a plurality of sensing heads, a plurality of coils and a plurality of interface circuits for sensing the rotational speed of a plurality of rotating vehicle wheels.

15. An apparatus according to claim 14 further comprising a multichannel multiplexer for multiplexing said speed signals and corresponding output signals.

16. An apparatus according to claim 15 further comprising a test circuit for selecting one of said plurality of speed sensors for testing based upon a speed sensor selected by said multichannel multiplexer and generating a test signal for testing said selected speed sensor.

17. An apparatus according to claim 14 further comprising a multiplexed dummy input transistor which does not drive a multichannel multiplexer input for providing a balanced biasing for said multiplexer.

* * * * *